United States Patent
Kolehmainen

(10) Patent No.: US 8,026,649 B2
(45) Date of Patent: Sep. 27, 2011

(54) ROTOR FOR ELECTRIC MACHINE

(75) Inventor: Jere Kolehmainen, Merikaarto (FI)

(73) Assignee: ABB Oy, Helsinki (FI)

( * ) Notice: Subject to any disclaimer, the term of this patent is extended or adjusted under 35 U.S.C. 154(b) by 56 days.

(21) Appl. No.: 12/441,774

(22) PCT Filed: Sep. 25, 2007

(86) PCT No.: PCT/FI2007/050512
§ 371 (c)(1),
(2), (4) Date: Mar. 18, 2009

(87) PCT Pub. No.: WO2008/037849
PCT Pub. Date: Apr. 3, 2008

(65) Prior Publication Data
US 2010/0001608 A1      Jan. 7, 2010

(30) Foreign Application Priority Data
Sep. 27, 2006   (FI) .................................... 20065599

(51) Int. Cl.
    *H02K 1/22* (2006.01)
(52) U.S. Cl. .... 310/216.045; 310/216.015; 310/216.054
(58) Field of Classification Search .............. 310/162, 310/166, 168, 211, 216.016, 216.045, 216.054, 310/216.114, 216.121
See application file for complete search history.

(56) References Cited

U.S. PATENT DOCUMENTS

| | | | | |
|---|---|---|---|---|
| 2,913,607 A | * | 11/1959 | Douglas et al. | 310/216.107 |
| 2,975,310 A | * | 3/1961 | Armstrong et al. | 310/163 |
| 3,979,821 A | * | 9/1976 | Noodleman | 29/598 |
| 5,010,267 A | * | 4/1991 | Lipo et al. | 310/162 |
| 5,091,668 A | | 2/1992 | Cuenot et al. | |
| 5,162,686 A | | 11/1992 | Royer | |
| 6,259,181 B1 | | 7/2001 | Kawano et al. | |
| 6,675,460 B2 | * | 1/2004 | Reiter et al. | 29/596 |
| 6,849,983 B2 | * | 2/2005 | Tajima et al. | 310/166 |
| 7,489,062 B2 | * | 2/2009 | Shah et al. | 310/216.016 |
| 2001/0026108 A1 | | 10/2001 | Tajima et al. | |
| 2003/0030343 A1 | | 2/2003 | Naito et al. | |
| 2003/0062791 A1 | | 4/2003 | Reiter, Jr. et al. | |

FOREIGN PATENT DOCUMENTS

| | | |
|---|---|---|
| EP | 0 430 795 A1 | 6/1991 |
| EP | 0 431 514 A1 | 6/1991 |
| EP | 1 130 746 A1 | 9/2001 |
| GB | 940997 | 11/1963 |
| GB | 1 337 785 A | 11/1973 |
| GB | 2 310 544 A | 8/1997 |

OTHER PUBLICATIONS

Form PCT/ISA/210 (International Search Report) dated Jan. 21, 2008.
Form PCT/ISA/237 (Written Opinion of the International Searching Authority) dated Jan. 21, 2008.
Finnish Search Report (with English translation of category of cited documents) dated Mar. 7, 2007.

* cited by examiner

*Primary Examiner* — Tran Nguyen
(74) *Attorney, Agent, or Firm* — Buchanan Ingersoll & Rooney PC

(57) ABSTRACT

Electric machine rotor comprising: an inner rotor element and an outer rotor element positioned more outwards in the radial direction than the inner rotor element, the inner rotor element and the outer rotor element being made of a material of high permeance, and an air gap of low permeance between the inner rotor element and the outer rotor element. The outer rotor element forms a shape-mating pair with the inner rotor element, the inner rotor element and the outer rotor element being shaped in such a way that radial detachment of the outer rotor element from the inner rotor element is prevented.

20 Claims, 2 Drawing Sheets

US 8,026,649 B2

ROTOR FOR ELECTRIC MACHINE

BACKGROUND OF THE INVENTION

Figure 1:
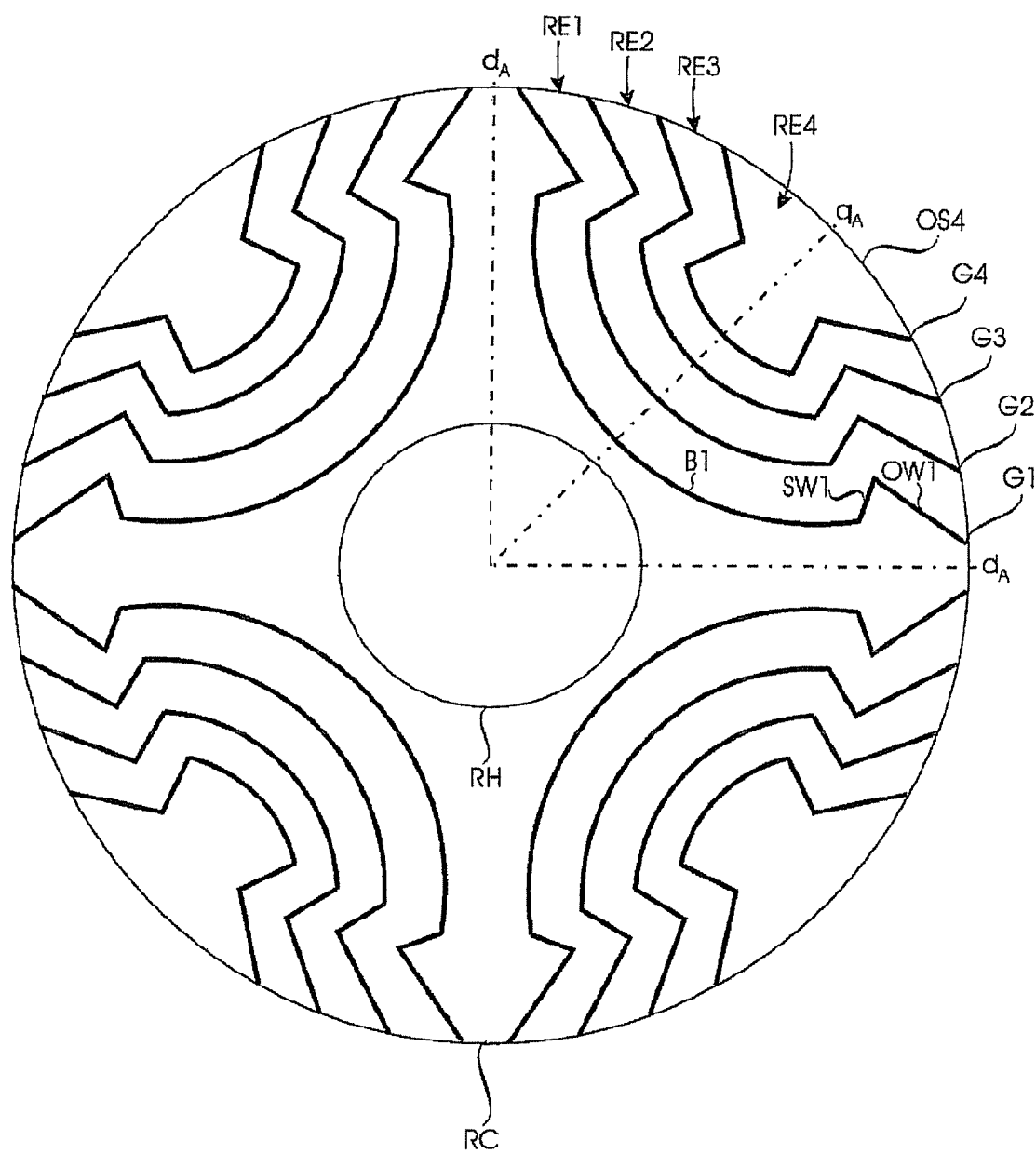

The invention relates to an electric machine rotor according to the preamble of claim 1.

In an electric machine rotor provided with a plural number of magnetic poles, arranged substantially at equal intervals along the circumference of the rotor, each magnetic pole has a direct pole axis. Two adjacent direct pole axes form an angle that is bisected by a quadrature axis. The reactance corresponding to the direct pole axis is called a direct-axis reactance and the reactance corresponding to the quadrature axis a quadrature-axis reactance.

There are many types of electric machines in which an effort is made to minimize the quadrature axis flux, i.e. to maximize the ratio of the direct-axis reactance to the quadrature-axis reactance. Examples of these electric machines include the reluctance motor and the synchronous induction motor.

Publication GB 940,997 discloses a rotor of a synchronous induction motor provided with flux paths extending between adjacent magnetic poles. The flux paths are formed with flux barrier slots of low permeance extending between adjacent flux paths. Between adjacent flux paths there are a plural number of 'necks' for mechanically holding the rotor together. The necks between the flux paths are made of the same material as the flux paths themselves, i.e. of a material, such as iron, having high permeance. A problem with this type of rotor construction is that the necks of high permeance cause leakage flux between the flux paths, i.e. the necks impair the ratio of direct-axis reactance to quadrature-axis reactance.

The higher the speed of rotation of the electric machine, the wider the necks between the flux paths have to be in order to hold the rotor together. Making the necks wider increases leakage flux, because it further decreases magnetic resistance between the flux paths at the necks.

SUMMARY OF THE INVENTION

It is an object of the invention to provide an electric machine rotor in which the ratio of the direct-axis reactance to the quadrature-axis reactance is high. The object of the invention is achieved by an electric machine rotor characterized by what is stated in independent claim 1. The preferred embodiments of the invention are disclosed in the dependent claims.

A basic idea of the invention is that an outer rotor element forms a shape-mating, i.e. a form-blocked, pair with an inner rotor element. Thus the inner rotor element and the outer rotor element are shaped in such a way that their geometry prevents the detachment in radial direction of the outer rotor element from the inner rotor element.

An advantage of the electric machine rotor of the invention is that the rotor is held together without necks between the inner rotor element and the outer rotor element. The fact that the necks are left out reduces leakage flux between the inner rotor element and the outer rotor element, thereby increasing the ratio of the direct-axis reactance to the quadrature-axis reactance. Moreover, the electric machine rotor of the invention sustains well centrifugal forces and magnetic forces.

LIST OF FIGURES

Figure 2:
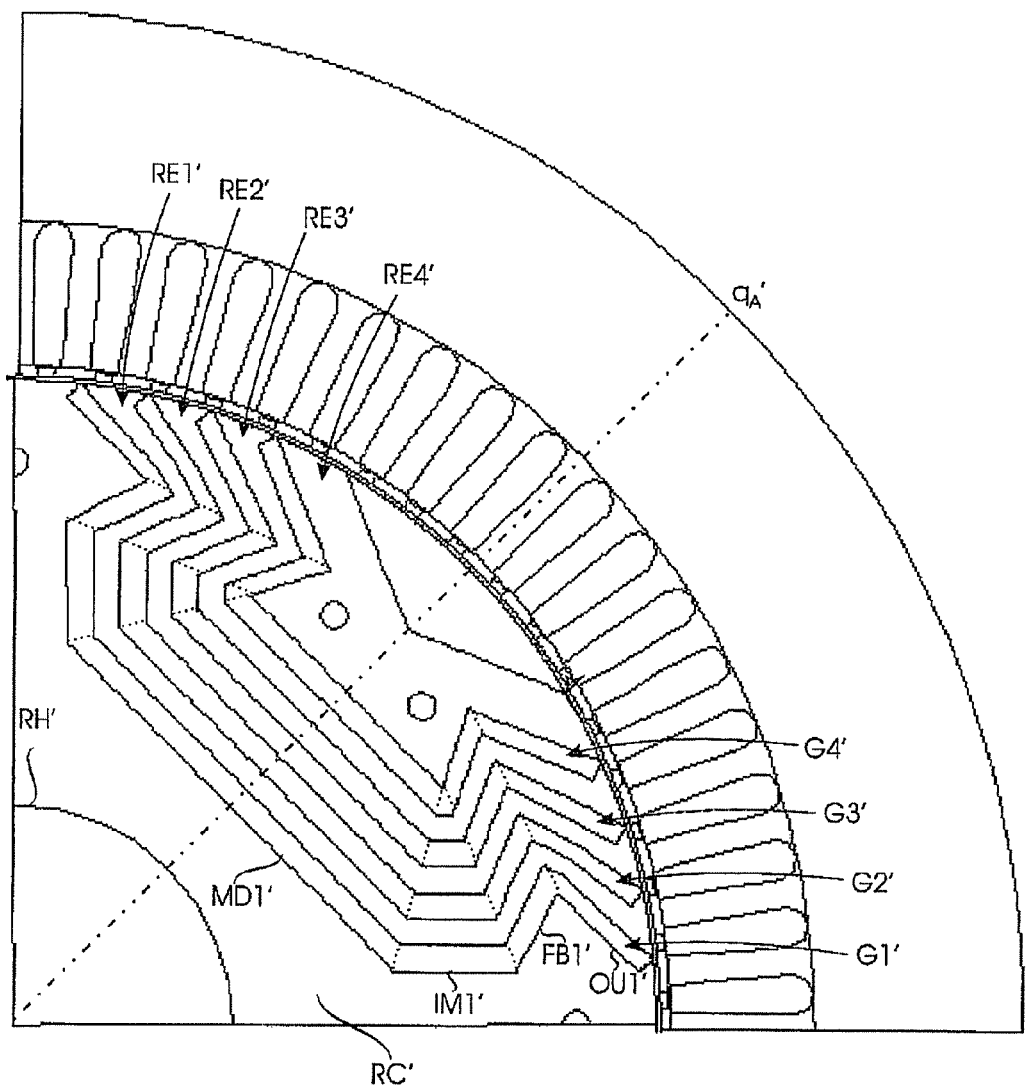

In the following the invention will be disclosed in greater detail with reference to preferred embodiments and the accompanying drawings, in which FIG. 1 is a cross-sectional view of a rotor of a four-pole reluctance motor according to an embodiment; and FIG. 2 shows a quarter of a cross-section of an electric machine provided with an electric machine rotor according to an alternative embodiment of the invention.

DETAILED DISCLOSURE OF THE INVENTION

FIG. 1 shows a rotor comprising a rotor core RC and four flux path configurations each comprising four flux path elements RE1-RE4.

The cross-section of the rotor core RC is substantially X-shaped, with each tip of the X extending to the surface of the rotor. The direct pole axis $d_A$ of each magnetic pole passes through the portion of the rotor core RC that extends to the rotor surface. In the middle of the rotor core RC there is a hole RH arranged to receive the motor shaft.

Each flux path configuration is located in such a way that the quadrature axis $q_A$ passes through the centre line of the flux path configuration. Each flux path configuration has an innermost flux path element RE1 located adjacent to the rotor core RC, with an air gap G1 of low permeance between the flux path element RE1 and the rotor core RC. Each flux path element RE1 forms a shape-mating pair with the rotor core RC, i.e. the rotor core RC and the flux path element RE1 are shaped in such a way that radial detachment of the flux path element RE1 from the rotor core RC is prevented.

Each direct pole axis $d_A$ and each quadrature axis $q_A$ pass through the axis of rotation of the rotor and extend in the direction of the rotor radius. Since a person skilled in electrical engineering is fully familiar with the definitions of the direct pole axis $d_A$ and the quadrature axis $q_A$, they are not discussed here.

The bottom B1 of the flux path element RE1, i.e. the portion closest to the centre point of the rotor, is slightly inward arcuate. Each outer edge of the bottom B1 ends at a corresponding straight side wall SW1. To accomplish a shape-mating attachment, the radial outer extremities of the side walls SW1 of the flux path element RE1 are closer to each other than their radial inner extremities. Each side wall SW ends at a corresponding straight outer wall OW1, which is almost perpendicular to a respective quadrature axis $q_A$ and extends to the surface of the rotor.

The flux path element RE1, the rotor core RC and the air gap G1 comprise shape-mating portions. The shape-mating portions of the flux path element RE1 comprise straight side walls SW1. The shape-mating portions of the rotor core RC in turn comprise those straight side walls of the rotor core RC that are opposite to the straight side walls SW1 of the flux path element RE1 on the other side of the air gap G1. The shape-mating portions of the material of the air gap G1 comprise the portions adjacent to the straight side walls SW1 of the flux path element RE1.

During rotation of the rotor over 50% of the forces acting on the material of the shape-mating portions of the air gap are compression forces. When the rotor rotates, an essential portion of the forces holding the flux path element RE1 in place consists of the counter forces directed by the air gap material to the flux path element RE1 in response to the compression forces acting on it.

Adjacent to each flux path element RE1, there is a second flux path element RE2, in a radially outer position, attached in a shape-mating manner to the flux path element RE1. Between the flux path elements RE1 and RE2 there is an air gap G2 of low permeance. Further, adjacent to each flux path element RE2, there is a flux path element RE3, in a radially outer position, attached in a shape-mating manner to the flux path element RE2. Between the flux path elements RE2 and RE3 there is an air gap G3 of low permeance.

Adjacent to the flux path element RE3 there is a flux path element 4, in a radially outer position, attached in a shape-mating manner to the flux path element RE3. Similarly as with other adjacent flux path elements, there is also an air gap of low permeance between the flux path elements RE3 and RE4. This air gap is indicated with reference G4.

The flux path element RE4 is the outermost flux path element in the corresponding flux path configuration. The outer surface OS4 of the flux path element RE4 is outward arcuate and forms the outer surface of the rotor at the respective quadrature axis $q_4$.

Similarly as the air gap G1, also air gaps G2-G4 are shaped in such a way that when the rotor rotates, over 50% of the forces acting on the shape-mating portions of the material of the air gaps G2-G4 are compression forces.

The flux path elements RE1-RE3 are arranged to conduct the magnetic flux from a first extremity of the element to a second extremity thereof, both the first extremity and the second extremity ending at the rotor surface and being spaced apart from one another at the rotor surface in the direction of its circumference. Each flux path element RE1-RE3 is shaped in such a way that the circumferential extremities, i.e. those above referred to as the first and the second extremity, are at a substantially greater radial distance from the mid-axis of the rotor than the outer surface of the centre portion of the flux path element in question.

Each flux path element RE1-RE4 and each air gap G1-G4 are substantially symmetrical to the respective quadrature axis $q_4$.

The rotor core RC and the flux path elements RE1-RE4 are made of a material having high permeance, such as iron. The rotor core RC and the flux path elements RE1-RE4 may consist of thin armature sheets whose plane is substantially perpendicular to the rotor axis. An armature sheet comprises an insulating layer at least on one surface thereof. Armature sheets are fully known in the art. Alternatively, the rotor core RC and the flux path elements RE1-RE4 may be made of solid iron.

Each air gap G1-G4 extends as a continuous gap from a first extremity to a second extremity thereof. The first extremity and the second extremity of each air gap both end at the rotor surface. When seen in the direction of the circumference of the rotor surface, the first extremity and the second extremity of the air gap are spaced apart from one another. Each air gap G1-G4 is arranged to increase the ratio of direct-axis reactance to quadrature-axis reactance. In other words, each air gap G1-G4 is arranged to provide a magnetic resistance which is as high as possible between the rotor elements bordering the air gap.

A person skilled in the art understands that the term 'air gap' refers generally to a gap of low permeance. Therefore, the air gap may also comprise other materials than air. For example, in order for the rotor according to the embodiment of FIG. 1 to function appropriately, it is necessary that the air gaps G1-G4 are at least partly filled with some other material than air to prevent a situation in which a magnetically conductive path would be formed between adjacent flux path elements or between the inner flux path element RE1 and the rotor core RC. In view of the above, the air caps may hereinafter be referred to as low-permeance caps since the caps can comprise air as well as other materials besides air.

The material of the air gaps G1-G4 is selected on the basis of the type of the electric machine. In a reluctance motor the air gaps G1-G4 may be filled with solid or powdery substances that are weakly conductive both as regards the magnetic flux and electricity. Useful substances include, depending on the embodiment, resins, plastics and carbon fibres. In a synchronous induction motor the air gaps may be provided with materials that conduct well electricity, such as stainless steel, aluminium or copper, to accomplish a squirrel cage winding. A synchronous induction motor may also be provided with short-circuiting rings. In some embodiments permanent magnets may be placed into the air gaps.

It is also possible to place materials of high electrical conductibility into the air gaps to achieve sufficient strength, without the purpose of providing a squirrel cage winding.

The number and shape of the flux path elements in each flux path configuration vary according to embodiment. Hence the number of flux path elements in a flux path configuration may be higher or lower than the four given in FIG. 1, and the shape of the flux path elements may differ from that shown in FIG. 1. For example, the radius of curvature of the bottom of the flux path element, i.e. of the portion closest to the centre point of the rotor, may be different in different parts of the bottom. The radius of curvature of the bottom may be greatest at the sides of the bottom, close to the side walls providing the shape-mating form. Further, the bottom of the flux path element may comprise a substantially straight portion that extends perpendicularly to the radial direction of the rotor.

In the embodiment of FIG. 1 the air gaps are extremely narrow elements. In alternative embodiments, however, the air gaps may be considerably wider, even as wide as the flux path elements, or wider. The dimensioning of the width of each air gap depends for example on the materials used for filling the air gap and the degree of magnetic resistance the air gap is to create.

FIG. 1 shows a rotor of a cylindrical rotor machine. However, a person skilled in the art will find it obvious that the electric machine rotor of the invention may also be used in a salient pole machine. The rotor of FIG. 1, for example, may be turned into a salient pole machine rotor by removing the outermost flux path elements RE4. It is also possible to provide the outer surface of each outermost flux path element with a hollow defined by a circular arch, for example.

Often the aim is to place the magnetic poles of the rotor at exactly equal intervals along the circumference of the rotor, within the limits of manufacturing tolerances. However, sometimes at least one of the magnetic pole pairs of the rotor are arranged into a slightly rotated position, i.e. the magnetic pole pair is offset by a half of a stator groove, for example, from the position that would create exactly equal intervals between the magnetic pole pairs. This procedure may be used for balancing oscillation or vibration of the torque caused by the stator grooves. Nevertheless, it is obvious that the magnetic poles of the rotor of a rotating electric machine are placed at substantially even intervals along the rotor circumference for even running of the electric machine.

FIG. 2 shows a quarter of a cross-section of an electric machine equipped with an electric machine rotor according to an alternative embodiment of the invention. In addition to the rotor quarter, FIG. 2 shows a corresponding quarter of a prior art stator, which is not described in greater detail in this context.

The electric machine rotor of FIG. 2 is a variation of the rotor of FIG. 1. The rotor parts in FIG. 2 are referred to with references corresponding to those used in FIG. 1, with the exception, however, that in FIG. 2 the references are provided with an apostrophe ('). Since the rotors of FIGS. 1 and 2 are very much alike, the description below will mainly concentrate on the characteristics of the rotor of FIG. 2 that deviate from those of the rotor of FIG. 1.

The rotor of FIG. 2 comprises a rotor core RC' and a flux path configuration with four flux path elements RE1'-RE4' and corresponding four air gaps G1'-G4'. The innermost flux path element RE1' of the flux path configuration is located adjacent to the rotor core RC', an air gap G1' of low permeance being provided between the flux path element RE1' and the rotor core RC'.

As regards its shape and thickness, the air gap G1' is similar to the flux path element RE1'. The most significant difference in the shape of the air gap G1' and that of the flux path element RE1' relates to their outermost extremities. The flux path element RE1' widens heavily just before it reaches the surface of the rotor. Correspondingly, the air gap G1' narrows steeply just before the surface of the rotor.

The air gap G1' comprises seven portions, which are all substantially straight and constant in width. As shown in FIG. 2, the air gap G1' comprises two outermost portions OU1', two shape-mating FB1' portions, two intermediate portions IM1' and one mid-portion MD1'. The air gap G1' is entirely filled with a casting material.

The outermost portions OU1' extend substantially perpendicularly in relation to the quadrature axis $q_A'$, the outermost extremity of both outermost portions OU1' ending at the rotor surface. The innermost extremity of each outermost portion OU1' ends at its respective shape-mating portion FB1'. In order for the shape-mating effect to be achieved, the outer extremities of the shape-mating portions FB1' are closer to each other than their inner extremities. The outer extremities of the shape-mating portions FB1' are the extremities ending at the respective outer portions OU1'. The innermost extremity of each shape-mating portion FB1' ends at its respective intermediate portion IM1'. The outer extremities of the intermediate portions IM1' are further apart from one another than the inner extremities. The mid-portion MD1' extends between the innermost end of the intermediate portions IM1' and is perpendicular to the corresponding longitudinal axis $q_A'$.

The shape-mating pair formed by the flux path element RE1' and the rotor core RC' is shaped in such a way that during the rotation of the rotor 70% of the forces acting on the material of the shape-mating portions FB1' are compression forces and 30% are shearing forces. Of the forces acting on the material of the intermediate portions IM1' during the rotation of the rotor 50% are compression forces and 50% shearing forces. Of the forces acting on the material of the mid-portion MD1' and the material of the outermost portions OU1' during the rotation of the rotor 95% are tensile forces and 5% shearing forces.

In the embodiment of FIG. 2 each flux path element RE1' forms a shape-mating pair with the rotor core RC' in such a way that the detachment of the flux path element RE1' from the rotor core RC' is prevented in the radial direction, i.e. in the direction of the centrifugal force. In other words, the flux path element RE1' could not leave the rotor in a straight radial direction even if the material of the air gap G1' was entirely removed.

As shown in FIG. 2, although the removal of the material from the air gap G1' would allow the flux path element RE1' to be pulled out of the rotor core RC', this would not be possible without rotating the flux path element RE1' about its longitudinal axis, which is parallel to the rotor axis. However, this does not have an effect on how the rotor stays together because, firstly, centrifugal force always acts in the radial direction and, secondly, the wide air gap G1' of FIG. 2 must in any case always be filled with material capable of sufficiently preventing both the radial displacement of the flux path element RE1' in relation to the rotor core RC' and the rotation of the flux path element RE1' about its longitudinal axis.

In some special applications the electric machine rotor of the invention may be provided with narrow necks between adjacent flux path elements. These narrow necks may be intended to balance the magnetic flux in the air gap, to reduce friction losses in the air gap or to facilitate the assembly of the rotor, for example. The narrow necks are configured to produce during the rotation of the rotor less than 50% of the forces holding the inner rotor element and the corresponding outer rotor element adjacent to each other.

A person skilled in the art will find it obvious that the basic idea of the invention can be implemented in various ways. The invention and its embodiments are therefore not restricted to the above examples but may vary within the scope of the claims.

The invention claimed is:

1. An electric machine rotor comprising:
    an inner rotor element and an outer rotor element positioned more outwards in a radial direction of the rotor than the inner rotor element, the inner rotor element and the outer rotor element being made of a material of high permeance, and a low permeance gap being arranged between the inner rotor element and the outer rotor element,
    wherein the outer rotor element forms a shape-mating pair with the inner rotor element, and the inner rotor element and the outer rotor element are shaped such that radial detachment of the outer rotor element from the inner rotor element is prevented.

2. A rotor according to claim 1, wherein the rotor has a plural number of magnetic poles at substantially equal intervals along a circumference of the rotor, each magnetic pole having a direct pole axis and an angle between adjacent direct pole axes is bisected by a quadrature axis,
    wherein each outer rotor element is positioned such that precisely one quadrature axis passes through each outer rotor element, respectively.

3. A rotor according to claim 2, wherein each outer rotor element is substantially symmetrical with the corresponding quadrature axis.

4. A rotor according to claim 1, wherein the low permeance gap is at least partly filled with at least one solid or powdery substance of low conductivity for both magnetic flux and electricity.

5. A rotor according to claim 1, wherein the low permeance gap is provided with at least one substance having low permeance but high electrical conductivity for a squirrel cage winding to be created for the rotor.

6. A rotor according to claim 5, wherein the rotor further comprises short-circuiting rings.

7. A rotor according to claim 1, wherein the low permeance gap extends as a continuous gap from a first extremity to a second extremity, the first and second extremities of the low permeance gap both ending at a surface of the rotor, and the first extremity and the second extremity of the low permeance gap being spaced apart from one another on the surface of the rotor, when seen in the direction of a circumference of the rotor.

8. A rotor according to claim 7, wherein the outer rotor element is a flux path element, which is configured to conduct magnetic flux from the first extremity of the flux path element to the second extremity thereof, the first and the second extremities of the flux path element both ending at the surface of the rotor, and the first extremity and the second extremity of the flux path element being spaced apart from one another on the surface of the rotor, when seen in the direction of the circumference.

9. A rotor according to claim 8, wherein the first extremity and the second extremity of the outer rotor element are located at a substantially greater radial distance from a mid-axis of the rotor than an outermost surface of a mid-portion of the corresponding rotor element.

10. A rotor according to claim 1, wherein the low permeance gap comprises a pair of shape-mating portions, the shape-mating portions being shaped such that over 50% of forces acting on the material of the shape-mating portions during rotation of the rotor are compression forces.

11. A rotor according to claim 10, wherein the low permeance gap is at least filled with a casting material.

12. A rotor according to claim 1, wherein the low-permeance gap is configured to increase the ratio of direct-axis reactance to quadrature-axis reactance.

13. An electric motor, comprising a rotor according to claim 1.

14. An electric motor according to claim 13, wherein the electric motor is a reluctance motor or a synchronous induction motor.

15. A rotor according to claim 2, wherein the low permeance gap is at least partly filled with at least one solid or powdery substance of low conductivity for both magnetic flux and electricity.

16. A rotor according to claim 3, wherein the low permeance gap is at least partly filled with at least one solid or powdery substance of low conductivity for both magnetic flux and electricity.

17. A rotor according to claim 2, wherein the low permeance gap is provided with at least one substance having low permeance but high electrical conductivity for a squirrel cage winding to be created for the rotor.

18. A rotor according to claim 3, wherein the low permeance gap is provided with at least one substance having low permeance but high electrical conductivity for a squirrel cage winding to be created for the rotor.

19. A rotor according to claim 4, wherein the low permeance gap is provided with at least one substance having low permeance but high electrical conductivity for a squirrel cage winding to be created for the rotor.

20. A rotor according to claim 2, wherein the low permeance gap extends as a continuous gap from a first extremity to a second extremity, the first and the second extremities of the low permeance gap both ending at a surface of the rotor and the first extremity and the second extremity of the low permeance gap being spaced apart from one another on the surface of the rotor, when seen in the direction of a circumference of the rotor.

* * * * *